United States Patent
Holmes

(10) Patent No.: US 8,116,951 B2
(45) Date of Patent: Feb. 14, 2012

(54) TRANSMISSION WITH SUBSTANTIALLY IDENTICAL GEAR SETS FOR TORQUE LOAD SHARING

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 796 days.

(21) Appl. No.: 12/180,929

(22) Filed: Jul. 28, 2008

(65) Prior Publication Data
US 2010/0023230 A1    Jan. 28, 2010

(51) Int. Cl.
*G06F 7/00* (2006.01)
(52) U.S. Cl. ............... 701/51; 701/55; 701/61; 701/87; 477/68; 475/208
(58) Field of Classification Search .............. 701/51, 701/55, 61, 79, 84, 87; 477/68, 84; 74/664, 74/640; 475/207, 208
See application file for complete search history.

(56) References Cited

U.S. PATENT DOCUMENTS

| | | | |
|---|---|---|---|
| 5,492,034 A | 2/1996 | Bogema | |
| 5,596,495 A * | 1/1997 | Brown et al. | ............ 701/51 |
| 6,569,051 B2 * | 5/2003 | Hirano et al. | ............ 475/208 |
| 7,481,737 B2 * | 1/2009 | Tabata et al. | ............ 477/3 |
| 7,503,872 B2 * | 3/2009 | Tabata et al. | ............ 477/5 |
| 2004/0224811 A1 | 11/2004 | Vornehm et al. | |

FOREIGN PATENT DOCUMENTS

| | | |
|---|---|---|
| CN | 1514148 A | 7/2004 |
| GB | 2112883 A | 7/1983 |

* cited by examiner

*Primary Examiner* — Gertrude Arthur Jeanglaude
(74) *Attorney, Agent, or Firm* — Quinn Law Group, PLLC

(57) ABSTRACT

A transmission has an input member and an output member, first and second intermediate shafts having substantially identical gear sets with gears concentric with and selectively connectable for rotation with the first and second intermediate shafts, respectively. Output gears are concentric with and rotatable with the output member and mesh with the substantially identical gear sets. First and second torque-transmitting devices are operable for transmitting torque from the input member to the first and second intermediate shafts, respectively. Torque-transmitting mechanisms are mounted concentric with, rotatable about and selectively engagable with the gears mounted on the intermediate shafts. A controller is operatively connected to the torque-transmitting mechanisms and to at least one of the torque-transmitting devices. The torque-transmitting mechanisms and torque-transmitting devices may be engaged such that torque is carried substantially equally by both intermediate shafts during a speed ratio established between the input member and the output member.

20 Claims, 7 Drawing Sheets

TRANSMISSION WITH SUBSTANTIALLY IDENTICAL GEAR SETS FOR TORQUE LOAD SHARING

TECHNICAL FIELD

The invention relates to a transmission having substantially identical gear sets on intermediate shafts to enable torque load sharing.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its speed range a number of times. The number of forward speed ratios that are available in the transmission determines the number of times the engine speed range is repeated. Early planetary gear transmissions had two speed ranges. This severely limited the overall speed range of the vehicle and required a relatively large engine that could produce torque through a wide speed range. This resulted in the engine operating at a specific fuel consumption point during cruising, other than the most efficient point. Therefore, more expensive, countershaft transmissions with three or four speed ratios became more popular.

With the advent of three- and four-speed automatic transmissions, the planetary gear transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

A variety of different types of transmissions are used to deliver multiple speed ratios including manual, automated manual, dual clutch and planetary transmissions. For example, a typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. This concept typically uses intermediate shaft gears with a different, dedicated gear pair to achieve each forward speed ratio (with the exception of some transmissions being able to achieve a direct drive ratio in a front engine, rear wheel drive application). The transmission utilized for a specific application may depend on many factors, such as a minimization of required components, packaging limitations, ratio coverage and torque requirements for launch.

Dual-clutch transmissions (DCTs) are, operationally, two manual-type transmission modules acting in parallel. DCTs typically shift in an alternating pattern, so that one module carriers torque while the other is selecting the next speed ratio. In this way, DCTs can transmit torque at all times, without interruption. However, they include the complexity, mass and bulk of two transmission modules, one of which is unused at any given time. Furthermore, since DCTs shift in an alternating pattern, almost half of the ratios are unavailable for selection at any given moment. That is, for example, a conventional DCT cannot shift directly from its sixth speed ratio to its second or fourth speed ratio without torque interruption.

SUMMARY OF THE INVENTION

A transmission is provided that is configured similarly to a dual input clutch transmission, but with substantially identical gear sets on two intermediate shafts such that both modules (i.e., both intermediate shafts and gear sets mounted thereon) may be used simultaneously to carry torque load in a given operating mode/speed ratio, to reduce the complexity, bulk and mass of the transmission. Because torque loading is shared, smaller (and therefore lighter) intermediate shafts satisfy durability requirements. Because a number of identical components are included, manufacturing costs may be reduced.

The transmission includes an input member and an output member. First and second intermediate shafts have substantially identical gear sets concentric with and selectively connectable for rotation with the first and second intermediate shafts, respectively. Output gears are concentric with and rotatable with the output member and mesh with the substantially identical gear sets. A first and a second torque-transmitting device (e.g., plate clutches, or one plate clutch and a one-way freewheeling clutch) are operable for transmitting torque from the input member to the first intermediate shaft and the second intermediate shaft, respectively. Torque-transmitting mechanisms are mounted concentric with and are rotatable about and selectively engagable with the gears mounted on the intermediate shafts. A controller is operatively connected to the torque-transmitting mechanisms and to at least one of the torque-transmitting devices. The torque-transmitting mechanisms and the torque-transmitting device(s) connected to the controller are selectively engagable in different combinations in response to the controller to establish different speed ratios between the input member and the output member, including at least one speed ratio that may be established between the input member and the output member using either of the intermediate shafts to carry torque.

The torque-transmitting mechanisms and the torque-transmitting devices are engaged such that torque is carried equally by both of the first and second intermediate shafts during such a speed ratio. Loads are momentarily doubled during shifts if output torque is maintained, because one of the intermediate shafts must bear all of the torque during a shift; however, shift events occupy far less of the transmission operating time than does load-sharing operation, and the intermediate shafts may therefore be designed for durability based primarily on the load sharing operation. Thus, each intermediate shaft may be much smaller and lighter than an intermediate shaft in a transmission without identical intermediate shaft gear sets, where torque load sharing does not occur. Loading of bearings used to support the various components are similarly reduced; hence, smaller and lighter bearings may be used.

Because substantially identical gear sets are used on each of the intermediate shafts, the transmission may be skip-shifted, i.e., shifted between two nonsubsequent speed ratios, because all speed ratios are available using either or both of the intermediate shafts and either or both of the substantially identical gear sets to carry torque loads. This may allow the transmission to be designed with fewer speed ratios in wider steps than a conventional DCT, because, for example, from the fifth speed ratio a down-shift directly to the third or fourth speed ratio may be made without torque interruption, and the second speed ratio need not be close enough to the fifth speed ratio to serve as the only alternative to the fourth speed ratio.

The torque-transmitting devices may each be plate-type clutches. Alternatively, a plate-type clutch and a one-way, mechanical clutch (i.e., a freewheeler that carries torque in one direction, and free wheels in an opposing direction) may be used. This alternative construction allows the transmission to be constructed so as to shift without power interruption from any speed ratio to any other speed ratio while including only the bulk, mass and cost of one plate-type clutch.

In some embodiments, the transmission may have a motor/generator connected for delivering torque to or receiving torque from one of the intermediate shafts, or may have motor/generators connected to both intermediate shafts. In either of such embodiments, the transmission is operable as a hybrid electromechanical transmission, and can provide a mechanical-only operating mode (in which the motor/generator(s) are off), an electric-only operating mode (in which a power source connected to the input member, such as an internal combustion engine) is off and the motor/generator(s) provide torque, and hybrid operating modes (in which both the engine and the motor/generator(s) provide torque to the respective intermediate shaft(s)). With motor/generator(s), synchronizers need not be provided on the intermediate shafts, whether separate from or integral with the torque-transmitting mechanisms, as the motor/generator(s) may be used to adjust the speed of the intermediate shaft(s) prior to engaging a torque-transmitting mechanism. Additionally, the motor/generator(s) may be used to restart the engine to transition from an electric-only to a hybrid operating mode.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
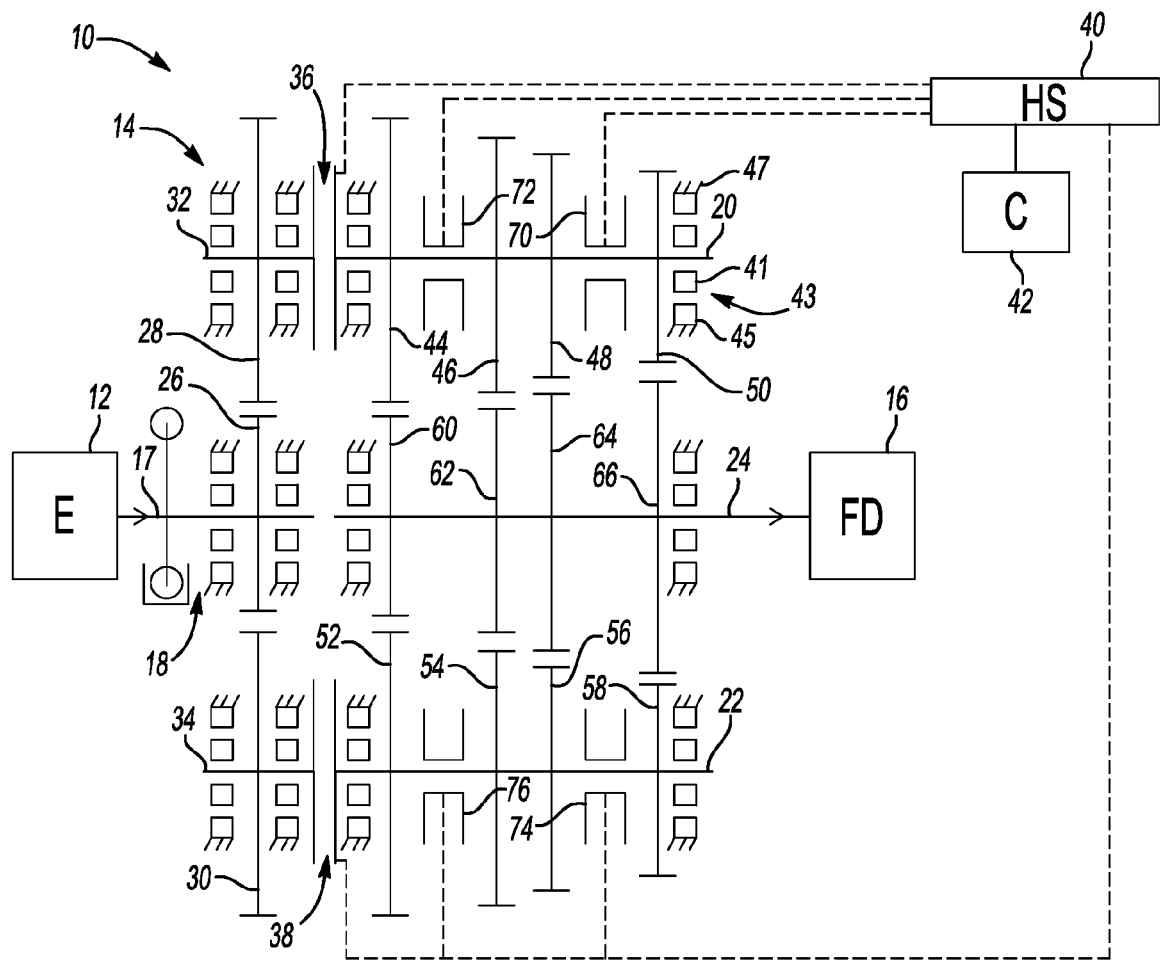
FIG. 1 is a schematic illustration of a first embodiment of a powertrain including a first embodiment of a transmission with plate-type input torque-transmitting devices and substantially identical intermediate shaft gear sets.

Referring to the drawings, wherein like reference numbers refer to like components throughout the several views, FIG. 1 shows a powertrain 10 that includes an engine 12 (labeled "E") operatively connected with a transmission 14 for powering a final drive 16 (labeled "FD") of a vehicle. An output member of the engine 12 is drivingly connected with an input member 17 of the transmission 14. A damping mechanism 18 absorbs vibration of the engine 12 acting on the input member 17. The transmission 14 has two intermediate shafts in the form of a first intermediate shaft 20 and a second intermediate shaft 22, both of which are spaced parallel to the input member 17 and an output member 24, and are operable for bearing torque loads to transfer torque from the input member 17 to the output member 24, and ultimately to the final drive 16 connected with the output member 24, as described below.

An input gear set, also referred to as a head gear set, includes co-planar gears 26, 28, and 30. Gear 26 is connected for rotation with the input member 17 and meshes with both gears 28 and 30. Gear 28 is connected for rotation with transfer shaft 32. Gear 30 is connected for rotation with transfer shaft 34. Gears 28 and 30 are substantially identical in that they are of the same diameter and have the same gear tooth count. Accordingly, the gear ratio of gear 32 to gear 26 is the same as the gear ratio of gear 30 to gear 26.

A first torque-transmitting device in the form of a friction plate clutch 36 is selectively engagable to transfer torque from transfer shaft 32 to intermediate shaft 20. A second torque-transmitting device in the form of a friction plate clutch 38 is selectively engagable to transfer torque from transfer shaft 34 to intermediate shaft 22. The friction plate clutches 36, 38 are engagable in response to hydraulic pressure delivered via a hydraulic system 40 (labeled "HS") under the control of an electronic controller 42 (labeled "C").

Roller element bearings 43 (only one numbered in FIG. 1 but twelve shown) support the input member 17, the output member 24, the transfer shafts 32 and 34 and the intermediate shafts 20, 22. Each roller element bearing 43 has an inner race 41 rotatable relative to an outer race 45 that is fixed to a stationary member 47, such as a casing of the transmission 14.

A first intermediate shaft gear set includes gears 44, 46, 48, and 50, each supported for concentric rotation about intermediate shaft 20 and selectively engagable for common rotation therewith as described below. A second intermediate shaft gear set includes gears 52, 54, 56, and 58, each supported for concentric rotation about intermediate shaft 22 and selectively engagable for common rotation therewith, as described below. The first and second intermediate shaft gear sets intermesh with an output gear set that includes gears 60, 62, 64, and 66, each connected for common rotation with the output member 24. The gears of the first intermediate shaft gear set are substantially identical with the gears of the second intermediate shaft gear set in that gear 50 is of the same diameter and has the same gear tooth count as gear 58, gear 48 is of the same diameter and has the same gear tooth count as gear 56, gear 46 is of the same diameter and has the same gear tooth count as gear 54, and gear 44 is of the same diameter and has the same gear tooth count as gear 52. Thus, the gear ratio of gear 50 to gear 66 (a first gear ratio, establishing a first speed ratio of the input member 17 to the output member 24) is the same as the gear ratio of gear 58 to gear 66, the gear ratio of gear 48 to gear 64 (a second gear ratio, establishing a second speed ratio of the input member 17 to the output member 24) is the same as the gear ratio of gear 56 to gear 66, the gear ratio of gear 46 to gear 62 (a third gear ratio, establishing a third speed ratio of the input member 17 to the output member 24) is the same as the gear ratio of gear 54 to gear 62, and the gear ratio of gear 44 to gear 60 (a fourth gear ratio, establishing a fourth speed ratio of the input member 17 to the output member 24) is the same as the gear ratio of gear 52 to gear 60. It is apparent from FIG. 1 that the gear ratios increase in numerical value in order from the first gear ratio to the fourth gear ratio, as gear 50 is the smallest of the first intermediate shaft gear set and gear 44 is the largest of the first intermediate shaft gear set. Likewise, the corresponding speed ratios of the input member 17 to the output member 24 decrease in numerical value.

Torque-transmitting mechanisms 70, 72, in the form of dog clutches are splined to intermediate shaft 20 for common rotation therewith, and are movable axially with respect to the intermediate shaft 20 in response to the controller 42 and hydraulic system 40 to selectively engage the various gears 44, 46, 48, and 50. Specifically, torque-transmitting mechanism 70 is movable toward gear 50 until dog teeth (not shown) engage the torque-transmitting mechanism 70 with gear 50 to connect gear 50 for common rotation with intermediate shaft 20, thus allowing torque transfer from intermediate shaft 20 to output member 24 at the first gear ratio. Torque-transmitting mechanism 70 is movable toward gear 48 to engage with and connect gear 48 for common rotation with intermediate shaft 20, thus allowing torque transfer from intermediate shaft 20 to output member 24 at the second gear ratio. Torque-transmitting mechanism 72 is movable toward gear 46 to engage with and connect gear 46 for common rotation with intermediate shaft 20, thus allowing torque transfer from intermediate shaft 20 to output member 24 at the third gear ratio. Torque-transmitting mechanism 72 is movable toward gear 44 to engage with and connect gear 44 for common rotation with intermediate shaft 20, thus allowing torque transfer from intermediate shaft 20 to output member 24 at the fourth gear ratio.

Similarly, torque-transmitting mechanisms 74, 76, in the form of dog clutches are splined to intermediate shaft 22 for common rotation therewith, and are movable axially with respect to the intermediate shaft 22 in response to the controller 42 and hydraulic system 40 to selectively engage the various gears 52, 54, 56, and 58 with intermediate shaft 22. Specifically, torque-transmitting mechanism 74 is movable toward gear 58 until dog teeth (not shown) engage the torque-transmitting mechanism 74 with gear 58 to connect gear 58 for common rotation with intermediate shaft 22, thus allowing torque transfer from intermediate shaft 22 to output member 24 at the first gear ratio. Torque-transmitting mechanism 74 is movable toward gear 56 to engage with and connect gear 56 for common rotation with intermediate shaft 22, thus allowing torque transfer from intermediate shaft 22 to output member 24 at the second gear ratio. Torque-transmitting mechanism 76 is movable toward gear 54 to engage with and connect gear 54 for common rotation with intermediate shaft 22, thus allowing torque transfer from intermediate shaft 22 to output member 24 at the third gear ratio. Torque-transmitting mechanism 76 is movable toward gear 52 to engage with and connect gear 52 for common rotation with intermediate shaft 22, thus allowing torque transfer from intermediate shaft 22 to output member 24 at the fourth gear ratio.

Because the gear ratios are the same for corresponding (i.e., coplanar) gears of the intermediate shaft gear sets, a desired speed ratio between the input member 17 and the output member 24 may be achieved by engaging both input plate clutches 36, 38 and any one of the dog clutches 70, 72 on intermediate shaft 20 along with a corresponding one of the dog clutches 74, 76 on intermediate shaft 22 to engage corresponding gears (i.e., coplanar, substantially identical gears) for rotation with intermediate shafts 20, 22. When engaged in this manner, substantially equal torque loads are borne by each of the intermediate shafts 20, 22. Specifically, to establish the first, and lowest, speed ratio between the input member 17 and the output member 24, plate clutches 36 and 38 along with dog clutches 70 and 74 may be engaged, with dog clutches 70 and 74 controlled to engage with gears 50 and 58, respectively. A second speed ratio subsequently lower in numerical value to the first speed ratio is established when plate clutches 36 and 38 are engaged and dog clutches 70 and 74 are controlled to engage with gears 48 and 56, respectively. A third speed ratio subsequently lower in numerical value to the second speed ratio is established when plate clutches 36 and 38 are engaged and dog clutches 72 and 76 are controlled to engage with gears 46 and 54, respectively. A fourth speed ratio is established when plate clutches 36 and 38 are engaged and dog clutches 72 and 76 are controlled to engage with gears 44 and 52, respectively. It will be apparent to those skilled in the art based on the relative sizes of the gears shown in FIG. 1 that the numerical value of the speed ratios decrease in order as described above.

During each of the first, second, third, and fourth speed ratios, established as described above, substantially equal torque loads are borne by the first and second intermediate shafts 20, 22., i.e., the torque load between the input member 17 and the output member 24 on each intermediate shaft 20, 22 is half of what it would be if only one of the intermediate shafts 20, 22 was carrying torque between the input member 17 and the output member 24 at the given speed ratio. Only one of the intermediate shafts 20, 22 carries torque during a shift event to switch from one of the speed ratios to another of the speed ratios. Such a shift is accomplished by releasing (i.e., disengaging) one of the plate clutches 36, 38, and releasing the engaged dog clutch on the intermediate shaft 20 or 22 that is coaxial with the released plate clutch 36 or 38. A different one of the dog clutches on the intermediate shaft 20 or 22 that is not carrying torque is then engaged with one of the gears of the gear sets. The plate clutch 36 or 38 coaxial with the intermediate shaft 20 or 22 that is carrying torque is then disengaged while the other plate clutch is engaged, such that a speed ratio change is accomplished. The corresponding dog clutch on the intermediate shaft now not carrying torque may then be engaged with a specified gear, with any previously engaged dog clutch on that intermediate shaft released. The other plate clutch 36 or 38 is then engaged so that both intermediate shafts 20, 22 bear the torque load in the newly established speed ratio. Alternatively, if a fast acceleration is desired, a dog clutch on the intermediate shaft not bearing torque can be engaged to preselect a higher speed ratio, and the plate clutch 36 or 38 on that intermediate shaft then engaged, with the plate clutch on the intermediate shaft that had been carrying all of the torque in the newly established speed ratio simultaneously being disengaged. The dog clutch on the intermediate shaft not now carrying torque can then select the same higher speed ratio and the disengaged plate clutch can then be engaged.

For example, to propel the final drive 16 from a stand still, dog clutch 70 is engaged with gear 50 and dog clutch 74 is engaged with gear 58. The engine 12 is started and plate clutches 36 and 38 are engaged, with clutch pressures adjusted as necessary to establish torque transfer over both input shafts 20, 22 from the input member 17 to the output member 24 at the first speed ratio. To switch from the first speed ratio in which both intermediate shafts 20, 22 equally bear the torque load, to the second speed ratio, in which both intermediate shafts 20, 22 also equally bear torque loading, plate clutch 36 is released such that the entire torque load between the input member 17 and the output member 24 is temporarily carried by intermediate shaft 22. Dog clutch 70 is then shifted away from gear 50 toward and into engagement with gear 48. Plate clutch 36 is then engaged as plate clutch 38 is disengaged. Temporarily, the entire torque load is carried by intermediate shaft 20 in the second speed ratio. However, dog clutch 74 may now be moved out of engagement with gear 58 and into engagement with gear 56. Plate clutch 38 may now be engaged as well, so that the torque load of the second speed ratio is equally distributed between the intermediate shafts 20, 22. As discussed above, if an alternative fast acceleration shift is desired, the dog clutch 76 may be moved into engagement with gear 54 instead of dog clutch 74 moving into engagement with gear 56, and plate clutch 38 can then be engaged while plate clutch 36 is disengaged so that the torque load of the third speed ratio is carried by intermediate shaft 22 and the gears and bearings thereon. Dog clutch 72 can then be engaged with gear 46, and plate clutch 36 engaged so that the torque load of the third speed ratio is equally distributed over the two intermediate shafts 20, 22 and the gears and bearings thereon.

If the controller 42 determines that the torque borne by each of the intermediate shafts 20, 22 is not substantially equal (i.e., is not within a predetermined percentage range difference), then the controller 42 and hydraulic system 40 are used to modify the clutch pressure at input clutches 36, 38 as necessary in order to adjust and maintain substantially equal torque loading on the intermediate shafts 20, 22.

Reduced Component Size

As is well known to those skilled in that art, the wear on rolling elements, (w), such as gears and rolling-element bearings, and therefore their size is calculated by the product of the torque load (t), raised to a power, generally from 3.0 to 3.3, and the number of load cycles (N), such as the number of revolutions under that load:

$$w = t^{3.3} * N$$

Therefore, the requisite size of rolling elements to meet durability requirements would at first seem to be dominated by the maximum torque load, because of the exponent in the above formula. However, if the peak loads occur for a relatively few number of cycles, then the wear (w) may be more dependent on lower torque loads during longer runs (i.e., a greater number of load cycles (N) at the lower torque loading).

Thus, if output torque is maintained during a shift, one of the intermediate shafts 20, 22 must deliver all of the torque so that loading on that intermediate shaft is momentarily doubled. However, shift events are brief, so the durability requirements for rolling contact loading elements of the transmission design is dominated by load-sharing operation. Thus, each intermediate shaft 20, 22 can be substantially smaller and lighter than a transmission that offers only a single intermediate shaft for carrying torque loads between the input member 17 and the output member 24. That is, if a torque load during load-sharing has the value 1.0, wear (a value correlated with size) is $1^{3.3}=1.0$ per cycle, and a torque-load on the intermediate shaft during a shift event is 2.0, and wear is $2^{3.3}=9.85$, per cycle. If shift events occupy less than about ten percent of the number of cycles or the running time, then the continuous operation (load sharing) causes a majority of the cumulative rolling-contact wear. If, in fact, shift events occupy only one percent of running time, then, based on rolling contact wear, the sizes of gears and bearings on each of two intermediate shafts may be roughly 60% of the size of a single intermediate shaft necessary to bear the same loading. In this case, the "cost" of full skip shifting and the other advantages of this type of transmission, versus a conventional DCT with the same number of speed ratios would be roughly 20%, i.e. two additional intermediate shaft gears on each intermediate shaft for a total of eight gears on the intermediate shafts instead of four gears, each additional gear being 60% of the size of a single gear.

Loads on bearings 43 are reduced in comparison to a single intermediate shaft design by distributing the two intermediate shafts 20, 22 on opposite sides of the input member 17 and output member 24. Clutch pressure can be used to control the sharing of the loads on the two intermediate shafts 20, 22. Thus, if sensors operatively connected with the intermediate shafts 20, 22 indicate a difference in torque loads borne by the intermediate shafts 20, 22 is greater than a predetermined amount, then the controller 42 may adjust the pressure to clutches 36, 38, to redistribute the torque load equally. Alternatively, in this particular embodiment, the pressure of the two plate clutches 36, 38 may simply be maintained at a level only slightly above what is required to prevent them from slipping at the same time due to the given engine load, which will result in load sharing between the two plate clutches 36, 38 and therefore the intermediate shafts 20, 22 and their components.

Thus, with the transmission 14, in addition to the intermediate shafts 20, 22 and the intermediate shaft gear sets (gears 44, 46, 48, 50, and gears 52, 54, 56, 58) being substantially identical with one another, the friction plate clutches 36, 38, the transfer shafts 32, 34 and the bearings 43, may also be identical in order to realize economies of scale in purchase, and allow interchangeability in assembly.

Skip-Shifting

Another advantage of the transmission 14 is that any speed ratio may be selected following any other speed ratio (i.e., any gear may be selected following any other gear). Because all speed ratios are available using either (or both) of the intermediate shafts 20, 22 to carry torque, a shift may be made, for example, from the first speed ratio to the third speed ratio. Shifts are not confined to a shift between a speed ratio established by a gear on one of the intermediate shafts and a speed ratio established by a gear on the other intermediate shaft, as all speed ratios may be established using gears on either of the intermediate shafts 20, 22. Unlike a typical dual-input clutch countershaft transmission, the speed ratios need not be allotted to the intermediate shafts in an odd-even arrangement (i.e., wherein all odd speed ratios (first gear, third gear, etc.) are established by gears on one countershaft and all even speed ratios (second gear, fourth gear, etc.) are established by gears on the other countershaft.

As an example, the transmission 14 may be controlled via the controller 42 through the hydraulic system 40 to shift from the first speed ratio to the second speed ratio as follows. First, assuming that the first speed ratio is in a load-sharing mode, with both intermediate shafts 20, 22 carrying torque, and dog clutches 70 and 74 engaged with gears 50, 58, respectively, input clutch 38 is released so that all torque is carried, still in the first speed ratio, by intermediate shaft 20. (Alternately, input clutch 36 may be released with all torque then carried by intermediate shaft 22.) With the intermediate shaft 22 not carrying torque, the dog clutch 74 may be disengaged and dog clutch 76 engaged with gear 54 (skipping over engagement of gear 56). Input clutch 36 may then be released as input clutch 38 is engaged to transfer torque to intermediate shaft 22, establishing the third speed ratio. Dog clutch 70 may then be released and dog clutch 72 engaged with gear 46. Input clutch 36 may then be engaged and input clutch 38 slipped to transfer torque to intermediate shaft 20 so that both intermediate shafts 20, 22 share torque substantially identically and establish the third speed ratio. Similar skip shifts may be made either to upshift or downshift between nonsubsequent speed ratios.

Second Embodiment

Figure 2:
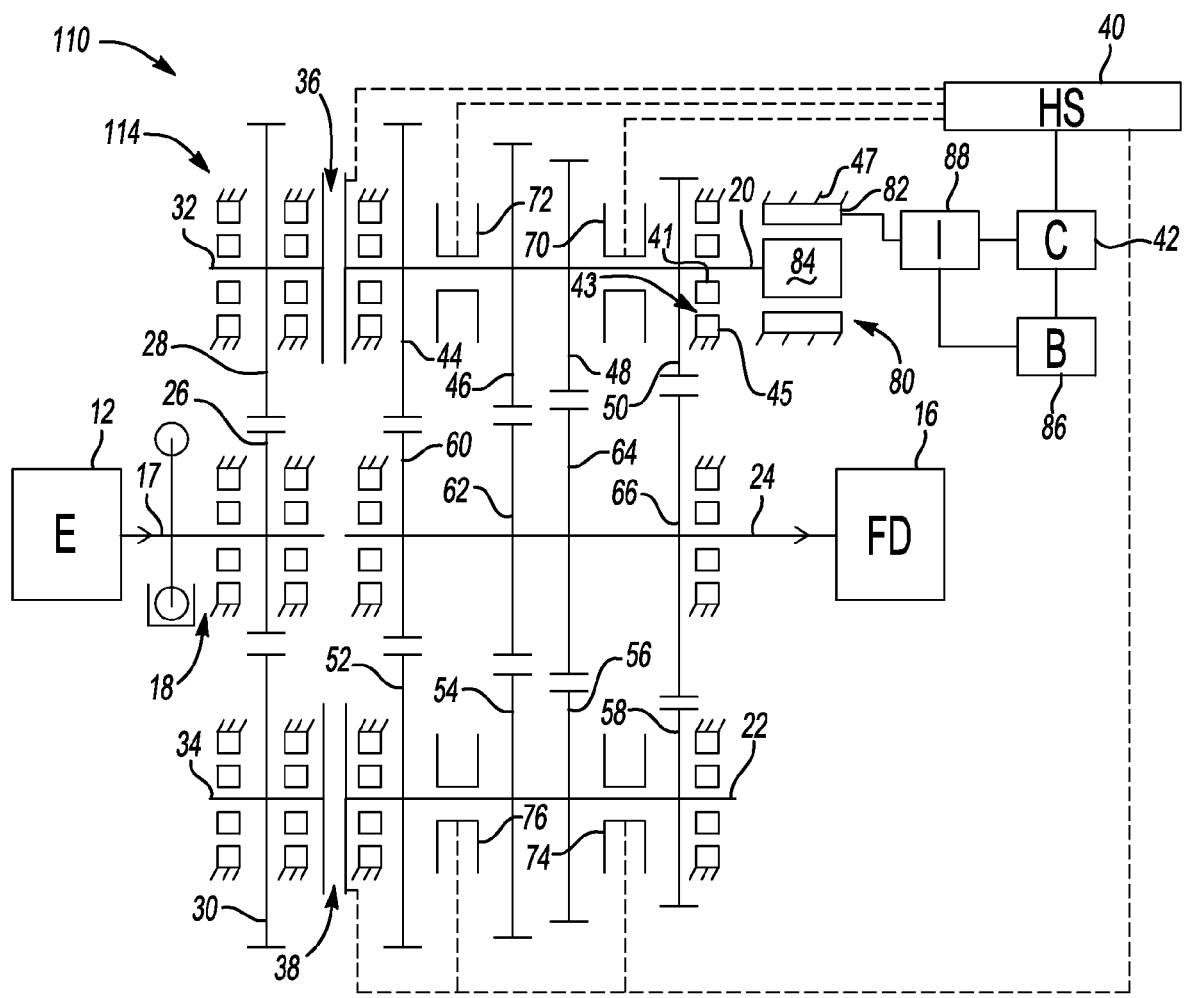
FIG. 2 is a schematic illustration of a second embodiment of a powertrain including a second embodiment of a transmission with plate-type input torque-transmitting devices, one motor/generator, and substantially identical intermediate shaft gear sets.

Additional embodiments within the scope of the invention are shown in FIGS. 2-7. The additional embodiments include many of the same components as the powertrain 10 of FIG. 1. Components having the same reference numbers throughout the different embodiments function and perform in the same manner as described with respect to FIG. 1. Referring to FIG. 2, powertrain 110 includes transmission 114 including the same like-numbered parts and components as powertrain 10 and transmission 14 of FIG. 1, with the addition of a motor/generator 80 having a stator 82 secured to the stationary member 47 and a rotor 84 secured for rotation with the intermediate shaft 20. The transmission 114 offers the same speed ratios, skip-shifting, and torque load sharing capabilities as the transmission 14 in a like manner. An electric power source 86, labeled "B", is operatively connected to the motor/generator 80 such that the motor/generator 80 may transfer power to or receive power from the power source 86. The controller 42 is operatively connected to the electric power source 86 to control the distribution of power from the motor/generator 80 to the power source 86 or to the motor/generator 80 from the power source 86 through a power inverter 88. The electric power source 86 may be one or more batteries. Other electric power sources, such as fuel cells, have the ability to provide, or store and dispense, electric power and may be used in place of batteries without altering the concepts of the present invention.

With the motor/generator 80 secured to the intermediate shaft 20, the transmission 114 may be operated in an electric-only operating mode in which the battery 86 supplies power to the motor/generator 80 to function as a motor to drive the output member 24 and final drive 16. In this electric-only mode, both of the input clutches 36, 38 are disengaged, and power is provided to the output member 24 by engagement of one of the dog clutches 70 or 72 with a respective one of the gears 44, 46, 48 or 50 to transfer torque from the intermediate shaft 20 to the output member 24. The motor/generator 80 may be controlled to operate as a generator in a regenerative braking mode. Additionally, the motor/generator 80 may be controlled to adjust the speed of the intermediate shaft 20 to bring it to the same speed as the intermediate shaft 22 during a shift in which torque is transferred to the intermediate shaft 20. In alternative embodiments, the motor/generator 80 may be connected with the input member 17, with the output member 24, or with the input shaft 22

Third Embodiment

Figure 3:
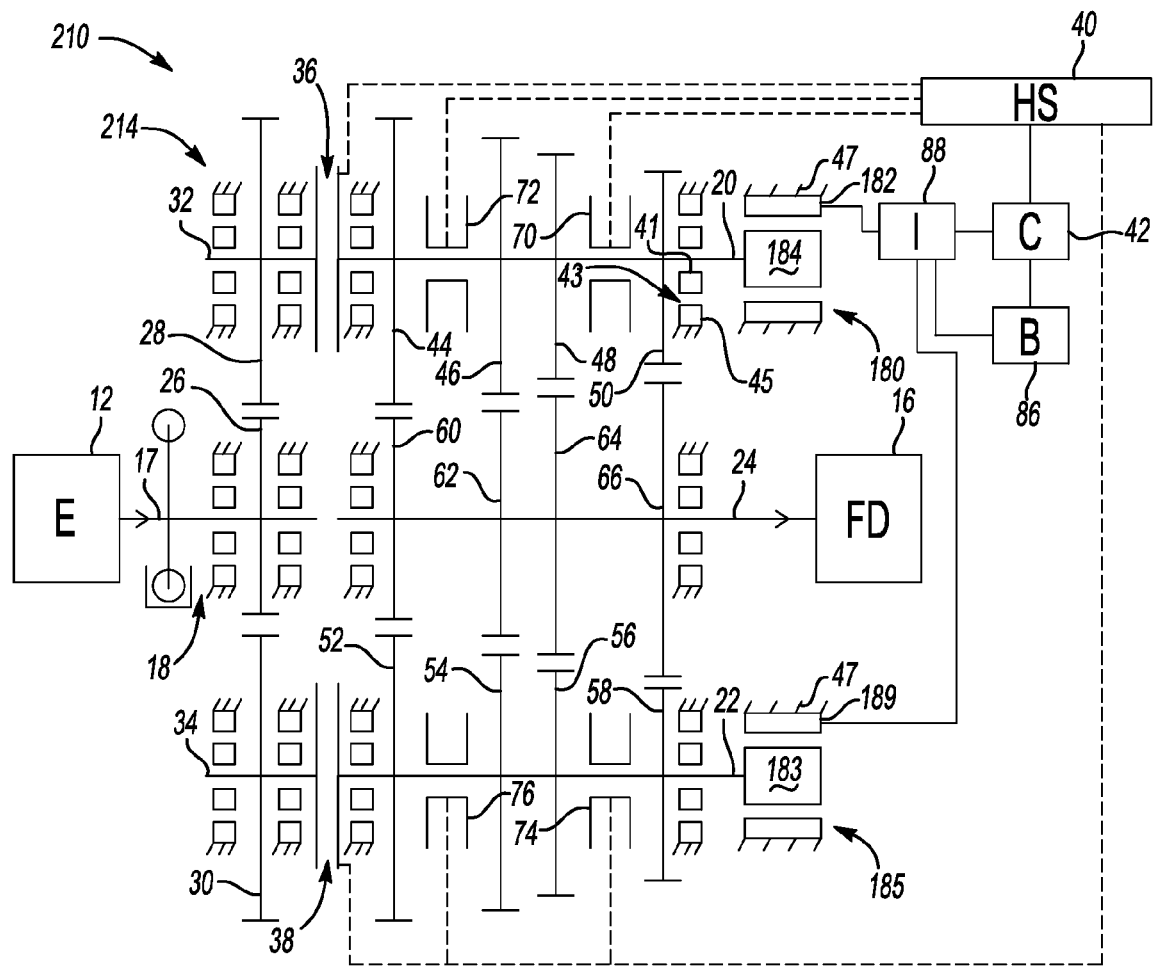
FIG. 3 is a schematic illustration of a third embodiment of a powertrain including a third embodiment of a transmission with plate-type input torque-transmitting devices, two motor/generators, and substantially identical intermediate shaft gear sets.

Referring to FIG. 3, a third embodiment of a powertrain 210 having a transmission 214 is illustrated. The powertrain 210 and transmission 214 include the same like-numbered parts and components as powertrain 10 and transmission 14 of FIG. 1, with the addition of two motor/generators 180 and 185. The addition of a second motor/generator 185 allows the transmission 214 additional advantages and operating modes with respect to the transmission 114 of FIG. 2.

Motor/generator 180 has a stator 182 secured to the stationary member 47 and a rotor 184 secured for rotation with the intermediate shaft 20. Motor/generator 185 has a stator 189 secured to the stationary member 47 and a rotor 183 secured for rotation with the intermediate shaft 20. The transmission 214 offers the same speed ratios, skip-shifting, and torque load sharing capabilities as the transmissions 14 and 114 in a like manner.

The motor/generators 180, 185 may be controlled by controller 42 to operate together at the same speed to provide torque to the output member 24 to propel a vehicle in an electric only mode, in which the input clutches 36, 38 are open and the engine 12 does not add torque to help propel the vehicle. Alternatively, the motor/generators 180, 185 may be controlled to add torque to, but not change the speed of, the intermediate shafts 20, 22 when the input clutches are engaged and the engine 12 is providing torque to the transmission 14, in a hybrid operating mode. For best efficiency, typically, electric motors operate around half of their maximum torque. Therefore, one motor/generator, either 180 or 185, should be of sufficient size such that it can be controlled to briefly maintain output torque while the torque-transmitting mechanisms and gears on the other intermediate shaft 20 or 22 (i.e., the intermediate shaft that is not bearing torque and does not have the torque-providing motor/generator mounted thereon) can be controlled to shift speed ratios or go into neutral to allow the other motor/generator 180 or 185 to start the engine 12 without affecting the output member 24. Thus, for example, the motor/generators 180, 185 may be controlled to perform an isolated start of the engine 12 from an electric-only operating mode. In the electric-only operating mode, both of the input clutches 36, 38 are disengaged and both motor/generators 180, 185 are supplying torque to the output member 24. To start the engine 12, the engaged dog clutch (74 or 76) on intermediate shaft 22 is disengaged and the input clutch 38 is engaged so that motor/generator 185 no longer supplies torque at the output member 24 but instead supplies torque at the input member 17 to start the engine 12. While motor/generator 185 is controlled to start the engine 12, motor/generator 180 continues to provide torque at the output member 24. Once the engine 12 is started and comes up to a predetermined speed, input clutch 36 is engaged such that both of the intermediate shafts share torque loading between the input member 17 and the output member 24.

Another advantage of the transmission 214 is that the motor/generators 180, 185 can be used to adjust the rotational speeds of the intermediate shafts 20, 22 to ensure that an oncoming one of the dog clutches 70, 72, 74 and 76 can smoothly engage with a respective one of the intermediate shaft gears 44, 46, 48, 50, 52, 54, 56 and 58 without using any synchronizers integrated with the dog clutches 70, 72, 74 and 76.

Fourth Embodiment

Figure 4:
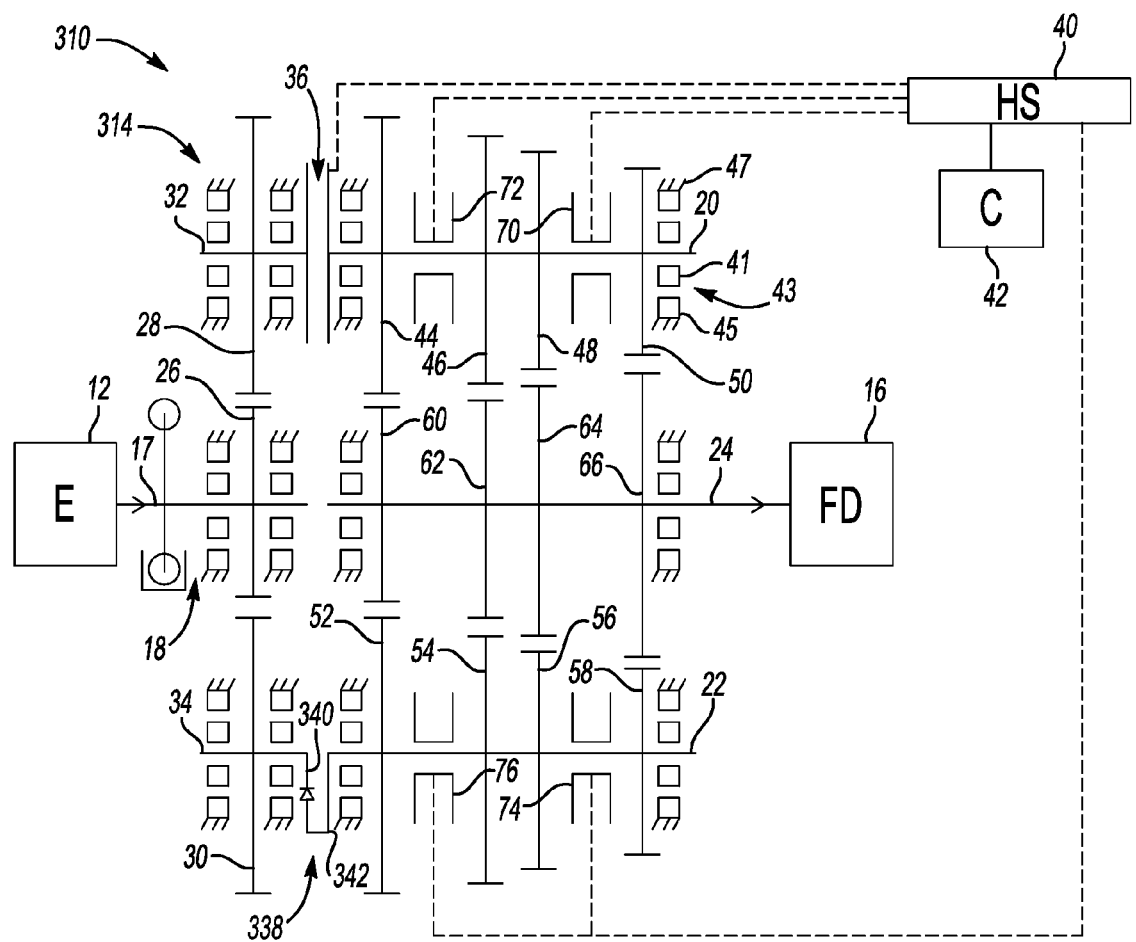
FIG. 4 is a schematic illustration of a fourth embodiment of a powertrain including a fourth embodiment of a transmission with one plate-type input torque-transmitting device, a one-way free-wheeling mechanical input clutch, and substantially identical intermediate shaft gear sets.

Referring to FIG. 4, a fourth embodiment of a powertrain 310 having a transmission 314 is illustrated. The powertrain 310 and transmission 314 include the same like-numbered parts and components as powertrain 10 and transmission 14 of FIG. 1, with the replacement of plate clutch 38 with a one-way mechanical clutch (freewheeler) 338 that carries torque in a forward direction, and free wheels in a reverse direction. Thus, the transmission 314 is a single hydraulic input clutch transmission. Again, clutch pressure can be used to control the sharing of loads on the two intermediate shafts 20, 22.

The one-way mechanical clutch 338 includes a first portion 340 of the clutch 338 connected for rotation with transfer shaft 34. A second portion 342 of the clutch 338 is connected for rotation with the intermediate shaft 22. The second portion 342 overruns the first portion 340 when rotating relative to the first portion 340 in a forward direction to interrupt torque transfer between the transfer shaft 34 and the intermediate shaft 22, but is engaged to rotate commonly with the first portion 340 when the intermediate shaft 22 is not rotating relative to the transfer shaft 34 in a forward direction, thereby permitting torque-transfer from the transfer shaft 34 to the intermediate shaft 22. Additionally, the one-way clutch 338 free wheels if the intermediate shaft 22 rotates in a reverse direction. Such a one-way clutch 338 is well known to those skilled in the art, and is advantageous as its engagement or disengagement is automatic, requiring no hydraulic or other type of actuation under the control of the controller 42.

The transmission 314 operates the same as transmission 14 described with respect to FIG. 1, except that up-shifts, such as from the second speed ratio to the third speed ratio, are always made by engaging the plate clutch 36, because the one-way clutch 338 can then freewheel, and down-shifts, such as from the second speed ratio to the first speed ratio, are always made by releasing the plate clutch 36, since the one-way clutch 338 can be freewheeling and then lock. For example to propel the final drive 16 from a stand still, dog clutch 70 is engaged with gear 50. The engine 12 is started and plate clutch 36 is engaged. Torque is transferred over intermediate shaft 20 from the input member 17 to the output member 24 at the first speed ratio. Then, dog clutch 74 is engaged with gear 58, and pressure is controlled on clutch 36 can be controlled to allow half of the load on the intermediate shaft 20 to be transferred to intermediate shaft 22. To shift to the second speed ratio, plate clutch 36 is released and all torque is temporarily carried over intermediate shaft 22 in the first speed ratio. Dog clutch 70 is moved into engagement with gear 48 and plate clutch 36 is engaged. Torque is now carried over intermediate shaft 20 at the second speed ratio. One-way mechanical clutch 338 overruns such that intermediate shaft 22 does not carry any torque. Accordingly, dog clutch 74 can be moved out of engagement with gear 58 and into engagement with gear 56 so that intermediate shaft 22 rotates at the same speed as intermediate shaft 20 and second portion 342 no longer overruns, with torque being carried by intermediate shaft 22 as well as intermediate shaft 20 in the second speed ratio. The down-shift is similar to the up-shift just described, but either the one-way clutch 338 or the dog clutch 74 on its intermediate shaft 22 must be designed to release the torque load on that intermediate shaft 22 to change the setting of the dog clutch 74 before releasing the plate clutch 36.

Fifth Embodiment

Figure 5:
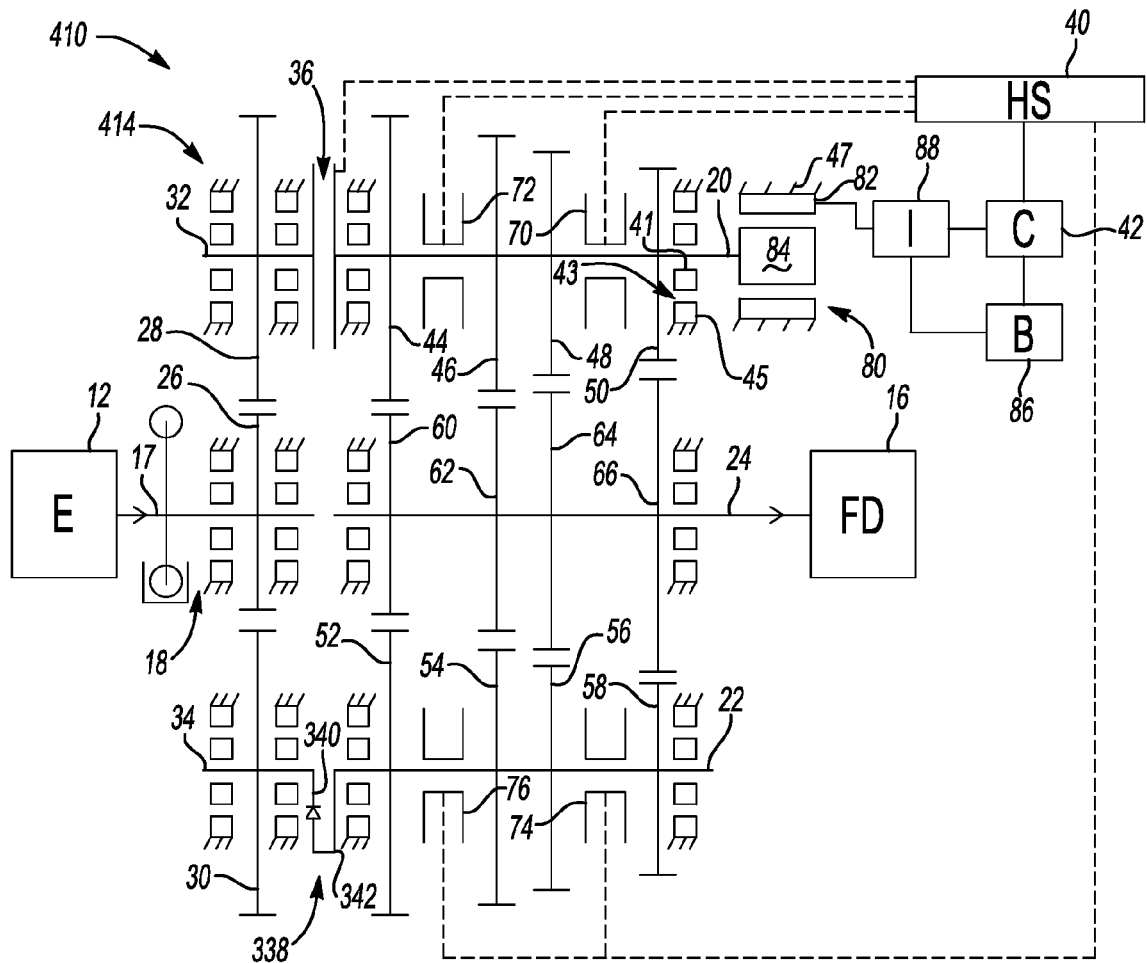
FIG. 5 is a schematic illustration of a fifth embodiment of a powertrain including a fifth embodiment of a transmission with one plate-type input torque-transmitting device, a one-way free-wheeling mechanical input clutch, one motor/generator, and substantially identical intermediate shaft gear sets.

Referring to FIG. 5, powertrain 410 includes transmission 414 including the same like-numbered parts and components as powertrain 310 and transmission 314 of FIG. 4, with the addition of the motor/generator 80 of FIG. 2 with stator 82 secured to the stationary member 47 and the rotor 84 secured for rotation with the intermediate shaft 20. The transmission 414 offers the same speed ratios and torque load sharing capabilities as the transmission 314 of FIG. 4 and operates in a like manner.

Additionally, the transmission 414 offers an electric-only operating mode and a hybrid operating mode. In the electric-only operating mode, the battery 86 supplies power to the motor/generator 80 to function as a motor to drive the output member 24 and final drive 16. In this electric-only mode, input clutch 36 is disengaged and one-way mechanical clutch 338 overruns so that power is provided to the output member 24 by engagement of one of the dog clutches 70, 72 with a respective one of the gears 44, 46, 48 and 50 to transfer torque from the intermediate shaft 20 to the output member 24. The motor/generator 80 may be controlled to operate as a generator in a regenerative braking mode.

In the hybrid operating mode, both the engine 12 and the motor/generator 80 add torque to the transmission 414 with the plate clutch 36 engaged and corresponding ones of the dog clutches (70 and 74; or 72 and 76) engaged with respective gears on the intermediate shafts 20, 22. Additionally, the motor/generator 80 may be controlled to adjust the speed of the intermediate shaft 20 to bring it to the same speed as the intermediate shaft 22 during a shift in which torque is transferred to the intermediate shaft 20. Furthermore, the motor/generator 80 attached to the intermediate shaft 20 with the plate clutch 36 can release the torque on the one-way clutch 338, intermediate shaft 22, and dog clutches 74, 76 to allow the engagement of the dog clutches 74, 76 to be changed for shifting. The motor/generator 80 may alternatively be connected with the input member 17, with the output member 24 or with the intermediate shaft 22, as described below with respect to FIG. 6.

Sixth Embodiment

Figure 6:
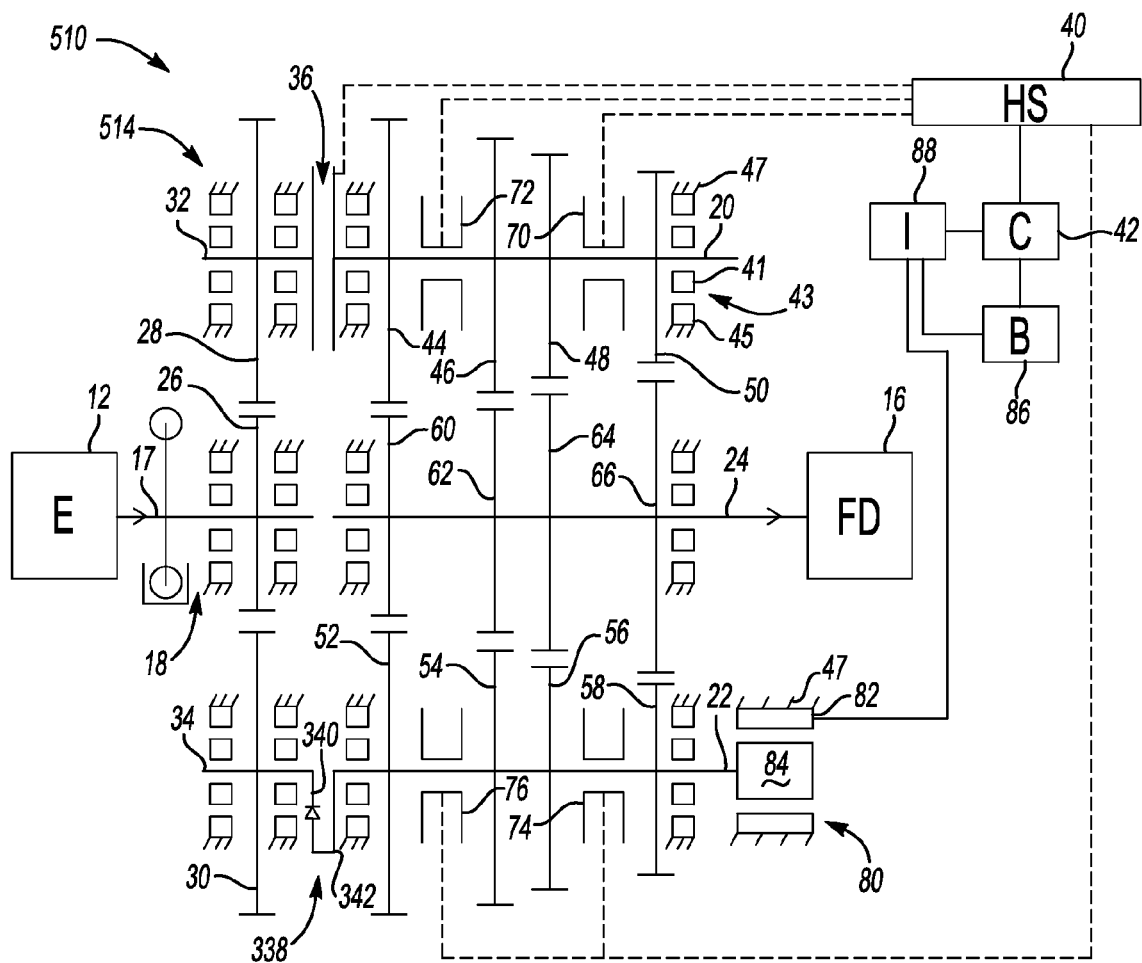
FIG. 6 is a schematic illustration of a sixth embodiment of a powertrain including a sixth embodiment of a transmission with one plate-type input torque-transmitting device, a one-way free-wheeling mechanical input clutch, one motor/generator, and substantially identical intermediate shaft gear sets.

Referring to FIG. 6, powertrain 510 includes transmission 514 including the same like-numbered parts and components as powertrain 310 and transmission 314 of FIG. 4, with the addition of the motor/generator 80 of FIG. 2 with stator 82 secured to the stationary member 47 and the rotor 84 secured for rotation with the intermediate shaft 22. The transmission 414 offers the same speed ratios and torque load sharing capabilities as the transmission 314 of FIG. 4 and operates in a like manner.

Mounting the motor/generator 80 on the intermediate shaft 22 allows the dog clutches 74, 76 and the one-way mechanical clutch 338 to disconnect the engine 12 to operate the vehicle in an electric-only mode, both forward and in regenerative braking. That is, if the motor/generator 80 is controlled to rotate intermediate shaft 22 in a reverse direction, or in a forward direction relative to first portion 340, then the one-way clutch 338 overruns, and torque is transferred from the motor/generator 80 to the output member 24.

Seventh Embodiment

Figure 7:
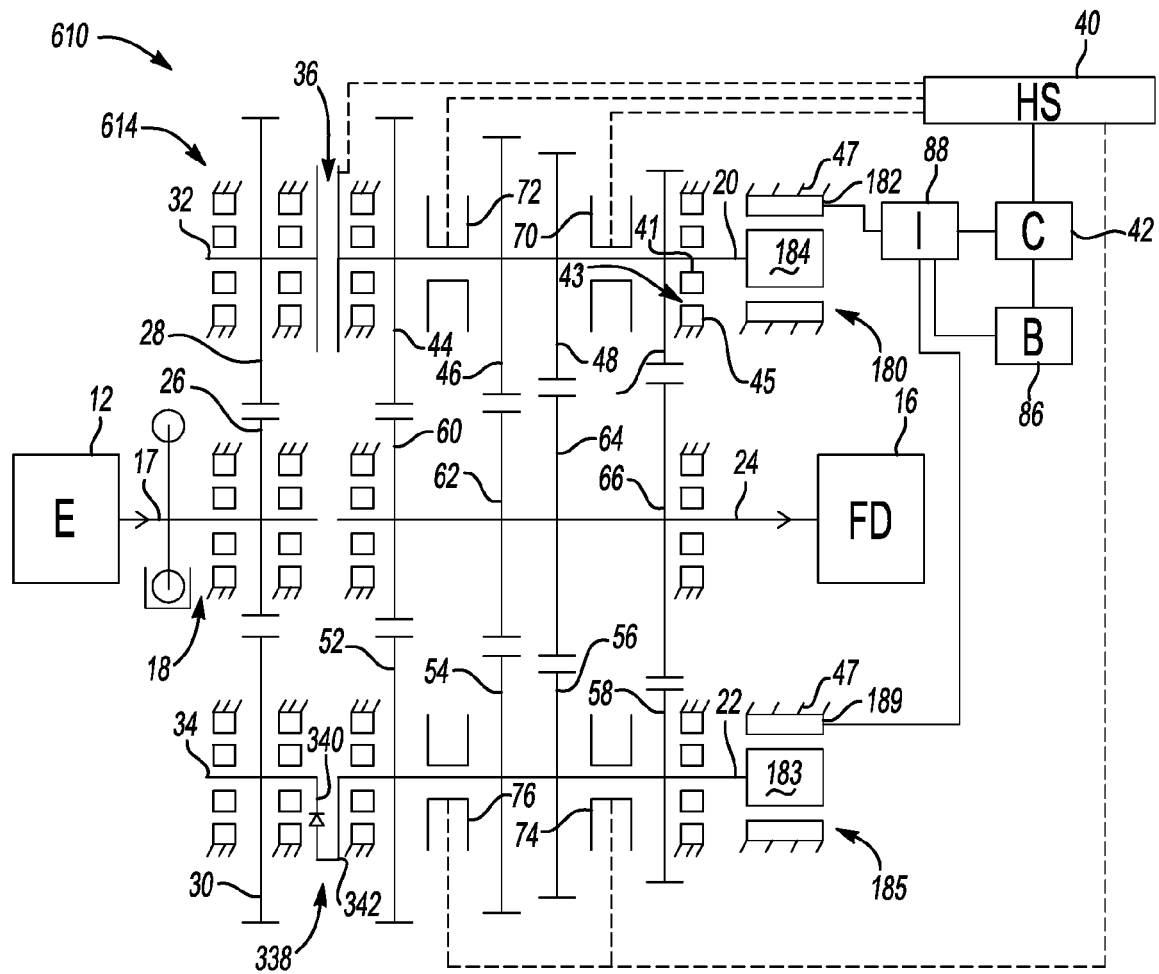
FIG. 7 is a schematic illustration of a sixth embodiment of a powertrain including a sixth embodiment of a transmission with one plate-type input torque-transmitting device, a one-way free-wheeling mechanical input clutch, two motor/generators, and substantially identical intermediate shaft gear sets.

Referring to FIG. 7, powertrain 610 includes transmission 614 including the same like-numbered parts and components as powertrain 310 and transmission 314 of FIG. 4, with the addition of the motor/generators 180 and 185 of FIG. 3 for rotation with the intermediate shafts 20 and 22, respectively. The transmission 614 offers the same speed ratios and torque load sharing capabilities as the transmission 314 of FIG. 4 and operates in a like manner. Additionally, the transmission 614 offers the electric-only, regenerative braking and hybrid operating modes described above with respect to FIGS. 3 and 6. The one-way mechanical clutch 338 overruns when the motor/generator 185 causes the second portion 342 to rotate faster than the first portion 340.

While the best modes for carrying out the invention have been described in detail, those familiar with the art to which this invention relates will recognize various alternative designs and embodiments for practicing the invention within the scope of the appended claims.

The invention claimed is:
1. A transmission comprising:
an input member and an output member;
first and second intermediate shafts;

substantially identical gear sets having gears concentric with and selectively connectable for rotation with the first and second intermediate shafts, respectively;

output gears concentric with and rotatable with the output member and meshing with the substantially identical gear sets;

a first and a second torque-transmitting device operable for transmitting torque from the input member to the first intermediate shaft and the second intermediate shaft, respectively;

torque-transmitting mechanisms mounted concentric with and rotatable with the respective intermediate shafts and operable for selective engagement with the gears of the substantially identical gear sets to connect the engaged gears for common rotation with the respective intermediate shafts; and a controller operatively connected to the torque-transmitting mechanisms and to at least one of the torque-transmitting devices; wherein the torque-transmitting mechanisms and the at least one of the torque-transmitting devices are selectively engagable in different combinations in response to the controller to establish different speed ratios between the input member and the output member, including at least one speed ratio that may be established between the input member and the output member using either of the intermediate shafts to carry torque; and wherein the torque-transmitting mechanisms and the at least one of the torque-transmitting devices are engaged such that torque is borne substantially equally by both of the first and second intermediate shafts during the at least one speed ratio.

2. The transmission of claim 1, wherein the substantially identical gear sets and output gears are configured to provide at least three forward speed ratios between the input member and the output member; and wherein the controller is configured to shift the transmission between nonsubsequent ones of the at least three forward speed ratios.

3. The transmission of claim 1, wherein the first and second torque-transmitting devices are plate clutches selectively engagable via clutch pressure controlled by the controller.

4. The transmission of claim 3, further comprising:
a motor/generator operatively connected to one of the first and second intermediate shafts and operable to selectively add torque to or receive torque from the at least one of the first and second intermediate shafts for at least one of synchronizing speeds of the intermediate shafts, providing torque at the input member or the output member, and regenerative braking 5. The transmission of claim 4, wherein the motor/generator is a first motor/generator operatively connected to the first intermediate shaft; and further comprising:
a second motor/generator operatively connected to the second intermediate shaft and operable to selectively add torque to or receive torque from the second intermediate shaft.

6. The transmission of claim 5, wherein the transmission is characterized by an absence of synchronizers to synchronize speeds of the intermediate shafts with the respective gears of the substantially identical gear sets prior to selective engagement of the torque-transmitting mechanisms with the gears of the substantially identical gear sets; and wherein the first and second motor/generators are controllable for synchronizing the speeds of the first and second intermediate shafts with the respective gears of the substantially identical gear sets.

7. The transmission of claim 5, wherein the motor/generators are controllable such that one of the motor/generators provides torque at the output member while the other motor/generator provides torque at the input member.

8. The transmission of claim 1, wherein the first torque-transmitting device is a plate clutch; wherein the second torque-transmitting device is a one-way free-wheeling clutch having a first portion rotatable at a predetermined ratio with respect to the input member and a second portion rotatable with the second intermediate shaft; wherein the one-way free-wheeling clutch is configured to carry torque when the first portion rotates in a forward direction at a speed not greater than a speed of the second portion, to overrun when the second portion rotates at a speed greater than the first portion, and to free-wheel when the second portion rotates in a direction opposing the forward direction.

9. The transmission of claim 8, further comprising:
a motor/generator operatively connected to the second intermediate shaft and operable to selectively add torque to or receive torque from the second intermediate shaft for at least one of synchronizing speeds of the intermediate shafts, providing torque at the input member or the output member, and regenerative braking.

10. The transmission of claim 9, further comprising:
another motor/generator operatively connected to the first intermediate shaft and operable to selectively add torque to or receive torque from the first intermediate shaft for at least one of synchronizing speeds of the intermediate shafts, providing torque at the input member or the output member, and regenerative braking.

11. The transmission of claim 1, wherein the intermediate shafts are configured for durability according to the substantially equal torque borne by both of the first and second intermediate shafts during the at least one speed ratio.

12. A method of controlling a transmission comprising:
providing first and second intermediate shafts and substantially identical gear sets each having gears selectively connectable for rotation with a respective one of the intermediate shafts via engagement in different combinations of torque-transmitting mechanisms concentric with the intermediate shafts to provide different speed ratios between an input member and an output member;

providing a set of output gears rotatable with the output member and meshing with the substantially identical gear sets;

providing first and second torque-transmitting devices operable for transmitting torque from the input member to the first and second intermediate shafts, respectively; and engaging the torque-transmitting devices and selected ones of the torque-transmitting mechanisms to establish torque flow from the input member to the output member over the two intermediate shafts at one of the speed ratios such that torque is carried substantially equally by each of the intermediate shafts during said one of the speed ratios.

13. The method of claim 12, wherein the substantially identical gear sets and the output gear set are configured to provide at least three forward speed ratios, including said one of the speed ratios, between the input member and the output member; and further comprising:
disengaging the first torque-transmitting device such that torque from the input member to the output member is carried by the second intermediate shaft and not by the first intermediate shaft;

disengaging one of the torque-transmitting mechanisms to disconnect one of the gears from the first intermediate shaft and engaging another of the torque-transmitting mechanisms to connect another of the gears for rotation with the first intermediate shaft;

engaging the first torque-transmitting device and disengaging the second torque-transmitting device to transfer torque to the first intermediate shaft such that a different speed ratio is established between the input member and the output member over the first intermediate shaft and the first intermediate shaft carries all of the torque between the input member and the output member;

disengaging one of the torque-transmitting mechanisms to disconnect one of the gears from rotation with the second intermediate shaft and engaging another of the torque-transmitting mechanism to connect another of the gears for rotation with the second intermediate shaft;

engaging the second torque-transmitting device; and slipping the first torque-transmitting device.

14. The method of claim 13, wherein the another of the gears connected for rotation with the second intermediate shaft is configured to transmit torque from the second intermediate shaft through the output gear set to establish the different speed ratio; and wherein the slipping the first torque-transmitting device transfers torque to the second intermediate shaft such that torque load will be borne substantially equally by the first and second intermediate shafts in the different speed ratio.

15. The method of claim 13, wherein said one of the speed ratios is a first of the three speed ratios; wherein the different speed ratio is a second of the three speed ratios and is characterized by a lower numerical value than the first of the three speed ratios; wherein the another of the gears connected for rotation with the second intermediate shaft is configured to transmit torque from the second intermediate shaft through the output gear set to establish a third of the three speed ratios; wherein the third of the three speed ratios is lower in numerical value than the second of the three speed ratios.

16. The method of claim 13, wherein the different speed ratio is nonsubsequent in numerical value to the speed ratio in the at least three different speed ratios.

17. The method of claim 13, wherein a motor/generator is operatively connected to at least one of the intermediate shafts; and further comprising:

controlling the speed of the motor/generator to synchronize the speeds of the first and second intermediate shafts prior to said engaging another of the torque-transmitting mechanisms to connect another of the gears for rotation with the second intermediate shaft.

18. The method of claim 12, wherein a first motor/generator is operatively connected to the first intermediate shaft, a second motor/generator is operatively connected to the second intermediate shaft, and an engine is connected to the input member for providing torque to the input member; and further comprising:

disengaging the torque-transmitting devices while controlling the first motor/generator to provide torque through the substantially identical gear set having gears selectively connected for rotation with the first intermediate shaft and the output gear set to the output member to establish an electric-only operating mode in which the engine is stopped;

disengaging an engaged one of the torque-transmitting mechanisms from one of the gears on the second intermediate shaft such that all torque to the output member is provided by the first motor/generator;

engaging the second torque-transmitting device; and controlling the second motor/generator to provide torque to the input member to restart the engine to establish to a hybrid operating mode.

19. The method of claim 12, wherein the first torque-transmitting device is a plate clutch and the second torque-transmitting device is a one-way clutch; and wherein the engaging the torque-transmitting devices and selected ones of the torque-transmitting mechanisms includes:

engaging the first torque-transmitting device with the first intermediate shaft and one of the torque-transmitting mechanisms with one of the gears on the first intermediate shaft;

engaging one of the torque-transmitting mechanisms with one of the gears on the second intermediate shaft;

slipping the plate clutch to transfer some of the torque load from the first intermediate shaft to the second intermediate shaft such that the torque is borne substantially equally by the first and second intermediate shafts during said one of the speed ratios;

disengaging the first torque-transmitting device such that torque is not borne by the first intermediate shaft;

disengaging the one of the torque-transmitting mechanisms from the one of the gears on the first intermediate shaft and engaging one of the torque-transmitting mechanisms with another of the gears on the first intermediate shaft;

engaging the first torque-transmitting device such that torque is borne completely by the first intermediate shaft and another speed ratio is established between the input member and the output member while the second torque-transmitting device overruns;

disengaging the one of the torque-transmitting mechanisms from the one of the gears on the second intermediate shaft and engaging a different one of the torque-transmitting mechanism with a different one of the gears on the second intermediate shaft such that torque can be transmitted through the second intermediate shaft and the output gear set to the output member at the another speed ratio; and slipping the plate clutch to transfer torque from the first intermediate shaft to the second intermediate shaft such that torque is borne substantially equally by the first and second intermediate shafts in the another speed ratio.

20. A hybrid transmission comprising:

an input member;

an output member;

a first intermediate shaft substantially parallel with the input and output members;

a second intermediate shaft spaced from the first intermediate shaft and substantially parallel with the input and output members;

a first set of gears; wherein each of the gears of the first set of gears is concentric with and selectively engagable for rotation with the first intermediate shaft;

a second set of gears substantially identical with the first set of gears; wherein each of the gears of the second set of gears is concentric with and selectively engagable for rotation with the second intermediate shaft;

a set of output gears; wherein each output gear is concentric with and rotatable with the output member and intermeshes with a respective one of the gears of the first set of gears and a respective one of the gears of the second set of gears substantially identical with the respective one of the gears of the first set of gears;

a motor/generator operatively connected with one of the intermediate shafts for providing torque to or receiving torque from the one of the intermediate shafts;

a first torque-transmitting device for transferring torque from the input member to the first intermediate shaft;

a second torque-transmitting device for transferring torque from the input member to the second intermediate shaft;

a plurality of torque-transmitting mechanisms; wherein each of the torque-transmitting mechanisms is controllable for selectively transferring torque from one of the first and second intermediate shafts to a respective one of the gears of the first or second set of gears;

a controller operatively connected to the motor/generator, the torque-transmitting mechanisms and to at least one of the first and second torque-transmitting devices for selectively engaging the torque-transmitting mechanisms and the at least one of the first and second torque-transmitting devices in different combinations to establish various operating modes; and wherein both of the first and second torque-transmitting mechanisms are engaged during at least some of the operating modes such that both of the first and second intermediate shafts bear substantially equally torque loads.

\* \* \* \* \*